(12) United States Patent
Linert et al.

(10) Patent No.: US 9,896,216 B2
(45) Date of Patent: Feb. 20, 2018

(54) ECO MODE ECS LOGIC

(71) Applicant: HONEYWELL LIMITED, Morris Plains, NJ (US)

(72) Inventors: John Linert, Phoenix, AZ (US); Mike Koerner, Rancho Palos Verdes, CA (US); Raj Mohan Bharadwaj, Maple Grove, MN (US); Eric Blumer, Scottsdale, AZ (US); Kyusung Kim, Plymouth, MN (US)

(73) Assignee: HONEYWELL LIMITED, Morris Plains, NJ (US)

( * ) Notice: Subject to any disclaimer, the term of this patent is extended or adjusted under 35 U.S.C. 154(b) by 0 days.

(21) Appl. No.: 15/170,457

(22) Filed: Jun. 1, 2016

(65) Prior Publication Data
US 2017/0349290 A1 Dec. 7, 2017

(51) Int. Cl.
*B64D 13/00* (2006.01)
*B64D 13/08* (2006.01)
*B64D 13/04* (2006.01)
*B64D 13/06* (2006.01)

(52) U.S. Cl.
CPC ............ *B64D 13/08* (2013.01); *B64D 13/04* (2013.01); *B64D 2013/0603* (2013.01)

(58) Field of Classification Search
CPC .................. B64D 13/08; B64D 13/04; B64D 2013/0603; B64D 2013/0655
See application file for complete search history.

(56) References Cited

U.S. PATENT DOCUMENTS

| | | | |
|---|---|---|---|
| 4,742,761 A | 5/1988 | Horstman | |
| 5,516,330 A * | 5/1996 | Dechow | |
| 6,073,456 A | 6/2000 | Kawai et al. | |
| 7,775,447 B2 | 8/2010 | Scherer et al. | |
| 7,837,541 B2 | 11/2010 | Gray et al. | |
| 7,871,038 B2 | 1/2011 | Space et al. | |
| 8,888,046 B2 | 11/2014 | Cremers | |
| 2008/0115837 A1* | 5/2008 | Gray .................. | B64D 13/04 137/102 |
| 2014/0323026 A1* | 10/2014 | Lewis .................. | B64D 13/04 454/74 |
| 2015/0107261 A1 | 4/2015 | Moes et al. | |

* cited by examiner

*Primary Examiner* — Yuen H Wong
(74) *Attorney, Agent, or Firm* — Shimokaji IP

(57) ABSTRACT

An environmental control system (ECS) includes a controller; and a mode selector in communication with the controller and configured to select at least one of a plurality of modes. The mode is based on one of: number of occupants in an environment; activity of the occupants in the environment; destination of the environment; and performance of an engine that moves the environment. The controller is configured to change an ECS load on the system based upon the selected mode.

6 Claims, 4 Drawing Sheets

ECO MODE ECS LOGIC

BACKGROUND OF THE INVENTION

The present invention generally relates to environmental control systems (ECSs) and, more particularly, to ECSs that can operate in multiple modes.

An ECS can be designed to control temperature, pressure, and contaminants in an environment such as the passenger cabin and/or cockpit of an aircraft. In ideal environment conditions, the temperature, pressure and/or contaminants would not change even though aircraft is operating in different conditions, such as ferrying between airports, taking off, and cruising. Trying to maintain ideal environmental conditions can lead to aircraft penalties, such as higher fuel consumption.

As can be seen, there is a need for improved apparatus and methods for environmental control that enable different modes of operation.

SUMMARY OF THE INVENTION

In one aspect of the present invention, an environmental control system (ECS) comprises a controller; a mode selector in communication with the controller and configured to select at least one of a plurality of modes; wherein the mode is based on one of: number of occupants in an environment; activity of the occupants in the environment; destination of the environment; performance of an engine that moves the environment; and wherein the controller is configured to change an ECS load on the system based upon the selected mode.

In another aspect of the present invention, an environmental control system (ECS) of a vehicle comprises a controller; a state module in communication with the controller and configured to select an operating variable selected from the group consisting of pressure threshold, temperature threshold, number of occupants, and passenger state; a mode module in communication with the controller and configured to operate in at least one of the following modes: normal mode, eco mode, ferry mode, range mode, and performance mode; wherein, in an eco mode, an ECS load is reduced when an environment is one of less than an occupancy threshold and less than an activity threshold; wherein, in a ferry mode, the ECS load is reduced when the environment is empty of occupants; wherein, in a range mode, the ECS load is adjusted to ensure that the environment can reach a specific destination with required fuel reserves; wherein, in a performance mode, the ECS load is reduced when maximum engine thrust of the vehicle is desired; and wherein the controller is configured to adjust an energy consumption of the system based upon the operating state and the operating mode.

In yet another aspect of the present invention, a non-transitory computer-readable medium for an environmental control system (ECS) of a vehicle, comprising instructions stored thereon, that when executed on a processor, perform the steps of: selecting at least one of a plurality of operating modes, wherein the operating mode is selected based on one of: an occupancy of an environment; a distance to a destination to be reached by the environment; changing, based on the selected mode, at least one of: a load on the ECS; a ventilation valve enabling flow into the environment; and an outflow valve enabling flow out of the environment.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Generally, the present invention provides apparatus and methods for an environmental control system (ECS) that may be employed within an apparatus that has changing modes of operation, like a vehicle such as an aircraft. The ECS may operate in different modes depending on the different operating mode of the vehicle.

The different ECS modes may take into account occupancy in an environment within the vehicle, distance to a destination, and required fuel reserves. The different vehicle modes may take into account engine requirements, such as whether the vehicle is taxiing, accelerating, or cruising.

Figure 1:
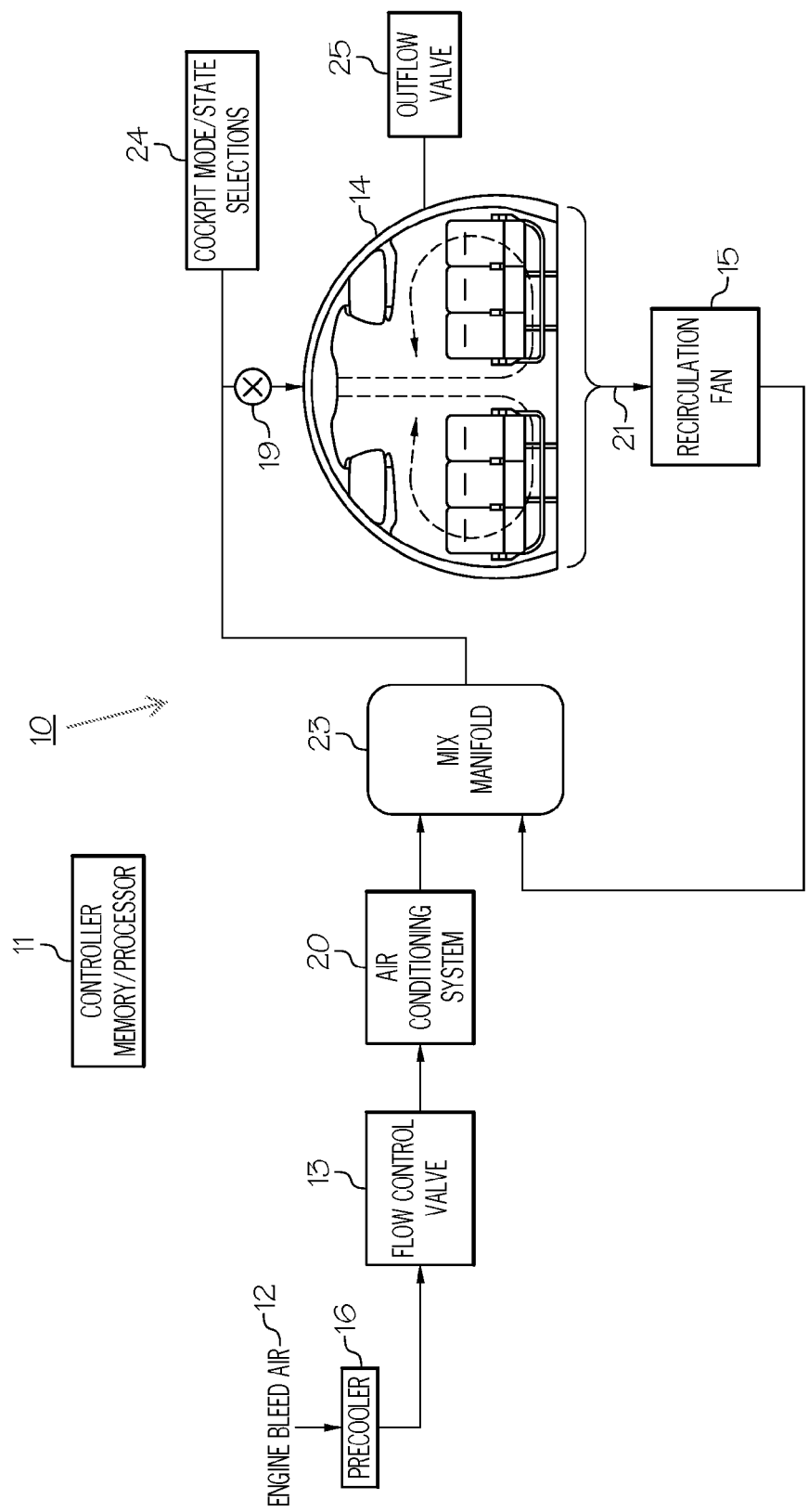
FIG. 1 is a schematic diagram of an environmental control system according to an embodiment of the present invention.

FIG. 1 depicts an exemplary environmental control system (ECS) 10 that may be employed for various applications such as a vehicle like an aircraft. The ECS 10 may receive an air 12, such as an engine bleed air. A precooler 16 may precool the air 12 and send it to a control valve 13. From the control valve 13, air may flow into an air conditioning system (ACS) 20.

The ACS 20 may be of conventional design and include an air cycle machine having a turbine and compressor. From the ACS 20, air may flow to a mix manifold 23. The mix manifold 23 may also receive recirculated air 21 from a first environment 14, such as a cabin of an aircraft. From the mix manifold 23, air may flow to a second environment 24, such as a cockpit of an aircraft. The first and second environments 14, 24 may, in combination, comprise a total environment. In the first environment 14, temperature and/or pressure sensors may be provided therein. The same may be provided in the second environment 24.

From the mix manifold 23, air may also flow through a ventilation valve 19 that may control the amount of air flowing into the first environment 14 and/or second environment 24. For example, the ventilation valve may eliminate flow in the aircraft cabin and allow flow into the cockpit during aircraft ferrying.

From the first environment 14, air may exit through an outflow valve 25. For example, the outflow valve 25 may be used to maintain aircraft pressurization by venting excess air overboard. In embodiments, the outflow valve 25 may not completely close; thus, the open area may not be less than a minimum percentage of the maximum open area.

Also from the first environment 14, air may exit as the recirculated air 21. A recirculation fan 15 may receive the recirculated air 21 and enable it to flow to the mix manifold 23.

Figure 2:
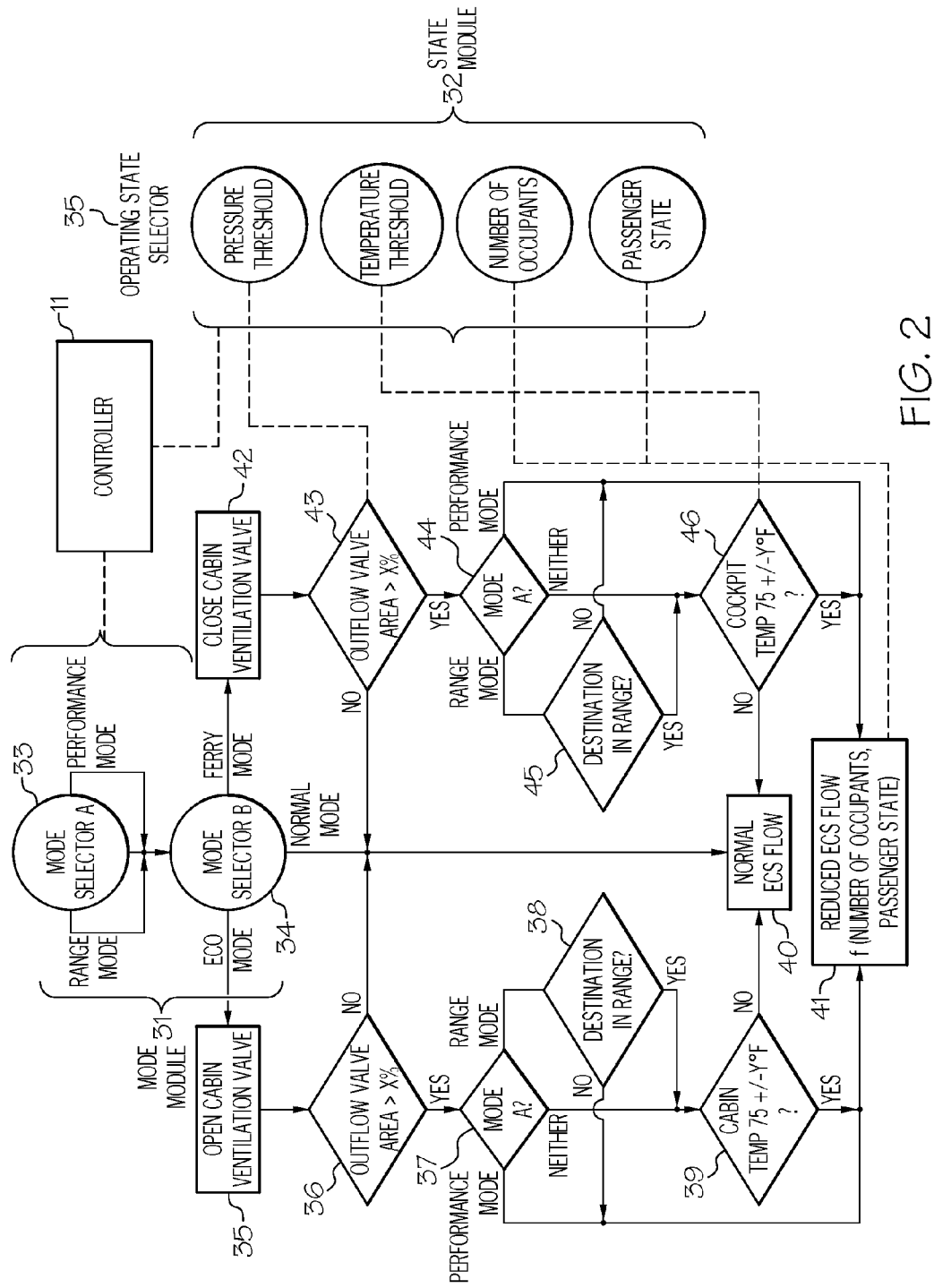
FIG. 2 is a flow chart of a method according to an embodiment of the present invention.

In FIG. 2, the ECS 10 may further include a mode module 31 and/or state module 32 that instruct a controller 11. The controller 11 may have a memory and processor. In turn, the controller 11 may instruct one or more components of the ECS 10 to operate in various manners.

The mode module 31 may be operated by a mode selector(s) 33, 34 in, for example the second environment 24. The state module 32 may be operated by a state selector 35 in, for example, the second environment 24. Herein, the mode selector and/or state selector may, in embodiments, be any mechanism that enables a user to select a mode and/or state. For the example, the selector may be switch, a button, or a handle. Herein, the mode module 31 and/or state module 32 may be hardware and/or software that is responsive to the mode selector and/or state selector.

In embodiments, the mode module 31 may operate in one of a range mode, a performance mode, and ECO mode, a ferry mode, and a normal mode. The operating modes may be based on one or more operating conditions such as occupancy, distance to destination, fuel reserves, and engine thrust. Moreover, the operating modes may be based on number of occupants in an environment; activity of the occupants in the environment; destination of the environment; and performance of an engine that moves the environment. The following are broad descriptions of exemplary operating modes.

In the range mode, according to embodiments, the ECS 10 can be adjusted to ensure that at least the first and/or second environment 14, 24 can reach a specific destination with required fuel reserves (i.e., the aircraft which holds the environment(s) can reach the destination). For example, in the context of an aircraft, the aircraft flight management system (FMS) can calculate whether the aircraft can reach its destination with specified fuel reserves. This calculation can be continuously updated based on flight conditions such as aircraft performance, fuel remaining, cruise altitude, aircraft weight, outside temperature, and winds aloft.

From the FMS calculation, the load on the ECS 10, such as the amount of bleed air 12 being conditioned by the ACS 20 can be adjusted—i.e., increased or decreased. For example, if the distance to the specific destination is short, and there is maximum fuel available, the ECS load may be increased for maximum occupant comfort. On the other hand, if the distance to the specific destination is long, and there is minimum fuel available, the ECS load may be decreased for minimum occupant comfort.

In the performance mode, according to embodiments, the ECS 10 can be adjusted to allow for maximum engine thrust of the vehicle that holds the first and/or second environments 14, 24. In embodiments, the load on the ECS 10, such as the amount of bleed air 12 being conditioned by the ACS 20, can be reduced. A lower ECS load can equate to increased thrust for shorter takeoffs, faster climbs and increased maximum speed as well as improved propulsion efficiency, better fuel economy, reduced emissions, and increased vehicle range.

In the ECO mode, according to embodiments, the ECS 10 can be adjusted when the first and/or second environments 14, 24 is occupied at less than an occupancy threshold (e.g., less than specific number of occupants or less than a percentage of maximum occupancy) and/or the number of occupants is less than an activity threshold (e.g., more than a specific number or percentage of occupants are sleeping). In embodiments, the load on the ECS 10, such as the amount of bleed air 12 being conditioned by the ACS 20, can be reduced.

In the ferry mode, according to embodiments, the ECS 10 can be adjusted when the first and/or second environments 14, 24 is empty of occupants (e.g., the vehicle is being flown to another airport to pick up passengers or for maintenance). In embodiments, the load on the ECS 10, such as the amount of bleed air 12 being conditioned by the ACS 20, can be reduced.

In the normal mode, according to embodiments, the ECS 10 can be adjusted when the first and/or second environments 14, 24 is occupied (e.g., the vehicle is at cruising altitude). In embodiments, the load on the ECS 10, such as the amount of bleed air 12 being conditioned by the ACS 20, can remain in a "normal" amount. In embodiments, "normal" can be a predetermined flow schedule and/or an amount that maximizes occupant comfort.

The operating states may include and be based on pressure threshold, temperature threshold, number of occupants, and passenger state. The following are broad descriptions of exemplary operating states.

A pressure threshold may define a minimum outflow valve 25 angle which determines how much margin the cabin pressure control system has to adjust to sudden decreases in altitude (i.e., increases in cabin pressure). This threshold may be set by the flight crew or it may be based on an algorithm that takes into account the operating mode or other flight parameters.

In the pressure threshold state, according to embodiments, the ECS 10 can be adjusted when the first and/or second environments 14, 24 is occupied (e.g., the vehicle is at cruising altitude). In embodiments, the amount of flow through the outflow valve 25 can be adjusted to maintain a pressure threshold.

A temperature threshold may define how closely the temperature is maintained about the optimum temperature for occupant comfort (typically 75° F.). This threshold may be set by the flight crew or it may be based on an algorithm that takes into account the operating mode or other flight parameters.

In the temperature threshold state, according to embodiments, the ECS 10 can be adjusted when the first and/or second environments 14, 24 is occupied (e.g., the vehicle is at cruising altitude). In embodiments, the load on the ECS 10, such as the amount of bleed air 12 being conditioned by the ACS 20, via the control valve 13, can be adjusted upwards or downwards to maintain a temperature threshold in the first and/or second environments 14, 24.

A number of occupants state may define how many people are aboard the aircraft. It can be used to calculate a minimum fresh air flow rate based on federal air regulations and/or on an air quality criteria which is affected by metabolic activity.

In the number of occupants state, according to embodiments, the ECS 10 can be adjusted when the first and/or second environments 14, 24 is occupied. In embodiments, the load on the ECS 10, such as the amount of bleed air 12 being conditioned by the ACS 20, via the control valve 13, can be adjusted upwards or downwards as the number of occupants is higher or lower.

A passenger state may define and account for variations in metabolic rate based on passenger size, gender, or activity level. For example, passengers that are sleeping have a lower metabolic rate, and thus produce less air contaminants, that passengers that have just boarded the aircraft or are eating a meal. This parameter can be set by the flight crew.

In the passenger state, according to embodiments, the ECS 10 can be adjusted when the first and/or second environments 14, 24 is occupied and a predetermined percentage of the occupants are in a particular activity state (e.g., sleeping). In embodiments, the load on the ECS 10, such as the amount of bleed air 12 being conditioned by the ACS 20, via the control valve 13, can be adjusted upwards or downwards as the occupant activity level is higher or lower.

In FIG. 2, exemplary steps of the apparatus and methods according the embodiments of the invention, in use, are described. The mode module 31 may communicate with and/or include a mode selector 33 and a mode selector 34. The mode selector 33 may select a range mode or performance mode. The mode selector 34 may select an ECO mode, a ferry mode, or a normal mode.

If the ECO mode is selected, a step 35 may include opening the ventilation valve 19.

In a step 36, it is determined whether the outflow valve 25 is open by more than a predetermined area and/or percentage threshold. If "no", then at a step 40, the air 12 flow into the ACS 20 is kept at "normal." If "yes", then at a step 37, it is determined if the performance mode, or range mode, or neither were selected.

If performance mode was determined to have been selected at the step 37, then at a step 41, the air 12 flow into the ACS 20 is reduced.

Alternatively, if range mode was determined to have been selected at step 37, then at a step 38, it is determined if the destination of the environment is within a predetermined distance range (i.e., a distance to a destination with a particular fuel reserve). If "no", then the air 12 flow into the ACS 20 is reduced at the step 41. If "yes", then at a step 39, a temperature of the first and/or second environments 14, 24 (e.g., the cabin temperature) is determined whether to be within a desired temperature range. If "no", then the air 12 flow into the ACS 20 is adjusted to "normal" at a step 40. If "yes", then the air 12 flow into the ACS 20 is reduced at the step 41.

Alternatively, if neither performance mode nor range mode were determined to have been selected at step 37, then at the step 39, the temperature of the first and/or second environments 14, 24 (e.g., the cabin temperature) is determined whether to be within a desired temperature range. If "no", then the air 12 flow into the ACS 20 is adjusted to "normal" at the step 40. If "yes", then the air 12 flow into the ACS 20 is reduced at the step 41.

Referring back to the mode selector 34, if ferry mode is selected, then at a step 42, the ventilation valve 19 is closed. In a step 43, it is determined whether the outflow valve 25 is open by more than a predetermined area and/or percentage. If "no", then at the step 40, the air 12 flow into the ACS 20 is kept at "normal." If "yes", then at a step 44, it is determined if the performance mode, or range mode, or neither were selected.

If performance mode was determined to have been selected at step 44, then at the step 41, the air 12 flow into the ACS 20 is reduced at the step 41.

Alternatively, if range mode was determined to have been selected at step 44, then at a step 45, it is determined if the destination of the environment is within a predetermined distance range (i.e., a distance to a destination with a particular fuel reserve). If "no", then the air 12 flow into the ACS 20 is reduced at the step 41. If "yes", then at a step 46, a temperature of the first and/or second environments 14, 24 (e.g., cockpit temperature) is determined whether to be within a desired temperature range. If "no", then the air 12 flow into the ACS 20 is adjusted to "normal" at the step 40. If "yes", then the air 12 flow into the ACS 20 is reduced at the step 41.

Alternatively, if neither performance mode nor range mode were determined to have been selected at step 37, then at the step 39, the temperature of the first and/or second environments 14, 24 (e.g., cockpit temperature) is determined whether to be within a desired temperature range. If "no", then the air 12 flow into the ACS 20 is adjusted to "normal" at the step 40. If "yes", then the air 12 flow into the ACS 20 is reduced at the step 41.

Referring back to the mode selector 34, if normal mode is selected, then at the step 40, the air 12 flow into the ACS 20 is kept at "normal."

In FIG. 2, the state module 31 may communicate with and/or include a state selector 35. The state selector 35 may select a pressure threshold state, a temperature threshold state, a number of occupants state, and a passenger state.

If the pressure threshold state is selected, a pressure threshold may be altered at step 43 by a change in the outflow valve area as described above.

If the temperature threshold state is selected, a temperature threshold may be altered at step 46 as described above.

If the number of occupants state is selected, a number of occupants (e.g., the number of occupants exceed a predetermined number of occupants and/or percentage of a maximum number of occupants) may be altered at step 41 as described above.

If the passenger state is selected, a passenger state may be altered (e.g., a predetermined number or percentage of occupants are below a threshold activity) at step 41 as described above.

Figure 3:
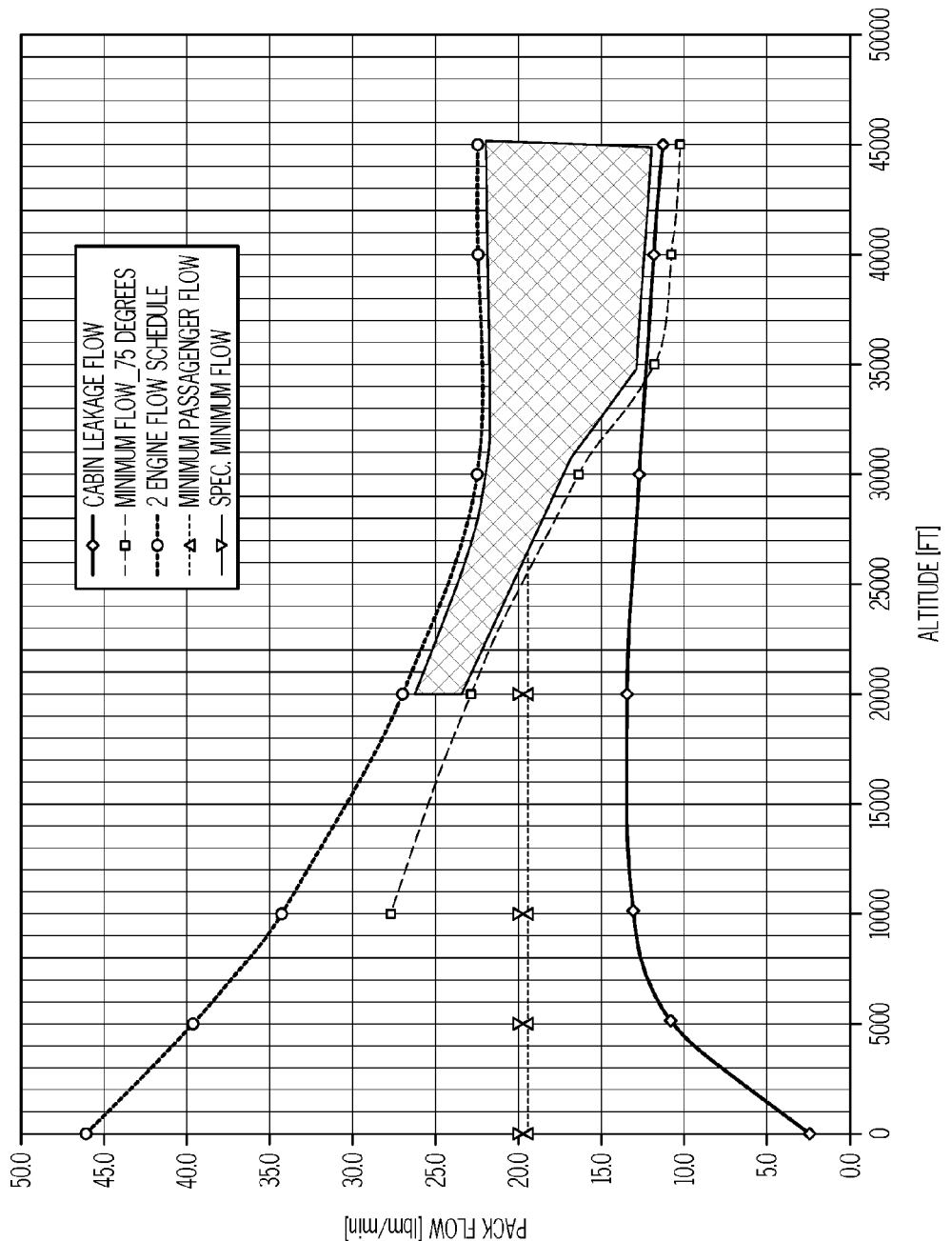
FIG. 3 is a graph of ECS pack flow v. environment altitude according to an embodiment of the present invention.

FIG. 3 is a graph of ECS bleed air flow into the ACS versus altitude where cabin temperature and pressure are maintained. The two horizontal lines depict an ideal condition of maximum occupant comfort at all altitudes. The shaded area of "reduction" depicts the reduced amount of ECS load.

Figure 4:
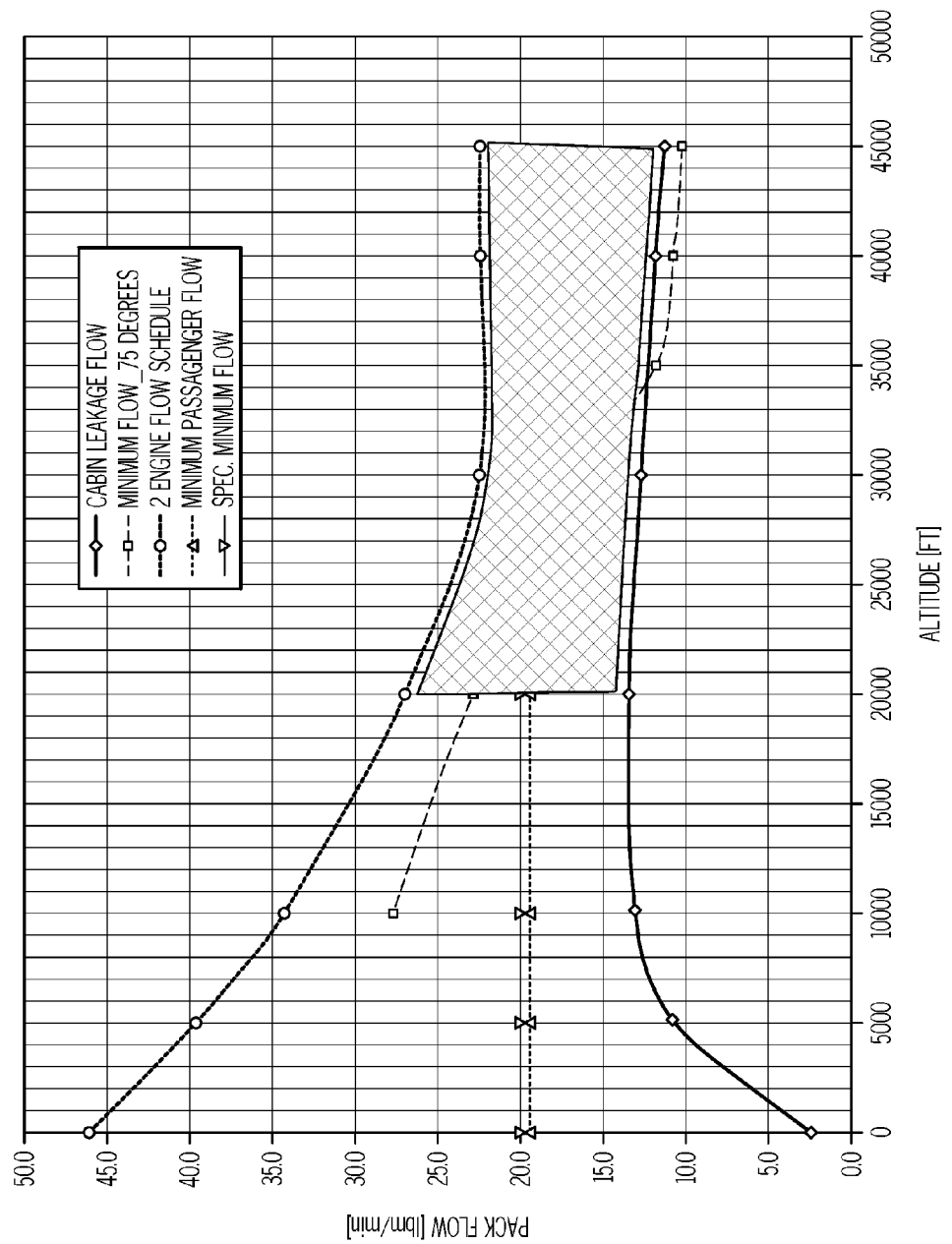
FIG. 4 is a graph of ECS pack flow v. environment altitude according to another embodiment of the present invention.

FIG. 4 is a graph of ECS bleed air flow into the ACS versus altitude where cabin pressure is maintained but cockpit temperature is not maintained. The two horizontal lines depict an ideal condition of maximum occupant comfort at all altitudes. The shaded area of "reduction" depicts the reduced amount of ECS load.

It should be understood, of course, that the foregoing relates to exemplary embodiments of the invention and that modifications may be made without departing from the spirit and scope of the invention as set forth in the following claims.

We claim:

1. A non-transitory computer-readable medium for an environmental control system (ECS) of a vehicle an aircraft comprising instructions stored thereon, that when executed on a processor, performing steps of:

selecting at least one of a plurality of operating modes, wherein the at least one of the plurality of operating modes is based on a distance to a destination to be reached by an environment;

changing, based on the selected at least one of the plurality of operating modes at least one of:

a load on the ECS;

a ventilation valve enabling flow into the environment; and an outflow valve enabling flow out of the environment.

2. The non-transitory computer-readable medium of claim 1, wherein another operating mode is based on an occupancy of the environment and the occupancy is an occupancy number threshold.

3. The non-transitory computer-readable medium of claim 1, wherein another operating mode is based on an occupancy of the environment and the occupancy is an occupancy activity threshold.

4. The non-transitory computer-readable medium of claim 1, wherein the environment includes a first environment and a second environment.

5. The non-transitory computer-readable medium of claim 4, wherein the ventilation valve is intermediate the first and second environments.

6. The non-transitory computer-readable medium of claim 4, wherein the first environment is an aircraft cabin and the second environment is an aircraft cockpit.

* * * * *